United States Patent
Itani

(10) Patent No.: US 7,451,390 B2
(45) Date of Patent: Nov. 11, 2008

(54) STRUCTURED DOCUMENT PROCESSING SYSTEM, METHOD, PROGRAM AND RECORDING MEDIUM

(75) Inventor: Noriko Itani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 10/237,177

(22) Filed: Sep. 9, 2002

(65) Prior Publication Data

US 2003/0088829 A1  May 8, 2003

(30) Foreign Application Priority Data

Sep. 20, 2001  (JP) ............... 2001-273362

(51) Int. Cl.
*G06N 3/00* (2006.01)
(52) U.S. Cl. .................................. 715/234
(58) Field of Classification Search ............ 715/506, 715/511, 513, 517, 523, 530, 234, 243, 254, 715/255
See application file for complete search history.

(56) References Cited

U.S. PATENT DOCUMENTS 5,907,837 A * 5/1999 Ferrel et al. ............... 707/3
6,671,853 B1 * 12/2003 Burkett et al. ............... 715/513
6,732,090 B2 * 5/2004 Shanahan et al. ............ 707/3
2001/0018697 A1 * 8/2001 Kunitake et al. ............ 707/517

* cited by examiner

*Primary Examiner*—Stephen Hong
*Assistant Examiner*—Kyle R Stork
(74) *Attorney, Agent, or Firm*—Staas & Halsey LLP

(57) ABSTRACT

This invention provides a structured document processing system comprising: a structured document storage unit for storing a structured document; a partial tree control unit which conceives the structured document stored in the structured document storage unit as a tree structure and controls the tree structure with divided partial trees; an expanding unit which acquires part of the structured document corresponding to a partial tree notified from the partial tree control unit from the structured document storage unit, analyzes part of the acquired structured document from viewpoints of its structure and expands as a hierarchical object in tree structure; and a processing unit for processing the object expanded by the expanding unit following an instruction from a user application.

11 Claims, 11 Drawing Sheets

FIG. 11

|  | CPU LOAD | MEMORY CONSUMPTION |
|---|---|---|
| CONVENTIONAL TYPE | × | × |
| CONVENTIONAL TYPE(PDOM) | △ | ○ |
| PRESENT INVENTION | ○ | ○ |

STRUCTURED DOCUMENT PROCESSING SYSTEM, METHOD, PROGRAM AND RECORDING MEDIUM

BACKGROUND OF THE INVENTION

1. Field of the Invention

The present invention relates to a processing system for handling a structured document such as standard generated markup language (SGML), extensible markup language (XML), hyper text markup language (HTML) and more particularly to a structured document processing system which treats the structured document as a tree structure upon processing.

2. Description of the Related Arts

In recent years, multiple systems, enterprises and individuals have been connected through Internet so as to exchange data widely for electronic data interchange (EDI), electronic commerce (EC), mobile phone service, digital TV service, web service and the like. Corresponding to such a situation, there has been a trend of unifying the format of data to be handled by computer. This enables diversified types of data depending on computer or application to be adopted by a different computer or application. The standard for this unification has been recommended officially by world wide web consortium (W3C) February 1998. The XML standard is a sub-set of the same standard SGML. The standard DOM (document object model) for an interface handling its object was recommended also by the W3C October 1998. Hereinafter, according to the XML standard, a character string enclosed by "<" and ">" is called tag, "<character string>", start tag, "</character string>" end tag, a character string sandwiched by the start tag and end tag, element, name of element described in a tag, element name and additional information for element, attribute.

The XML document describes data structure such that the tag is buried in a document itself. The data structure in which the tag is buried in a document ensures high flexibility and expandability in the data structure. Describing the tag with a text which is meaningful when seen by the human being enables the data handled by an independent system up to now to be handled easily by other system. The DOM processor has been widely used as the XML processor which acquires an element name, element content, attribute, character string and the like and transfers to user application, changes its content, adds and deletes.

FIG. 1 is an explanatory diagram of a conventional example. The conventional structured document processing system includes a structured document storage unit 1, an expanding unit 2, an object holding unit 3, a processing unit 4 and user application 6. The structured document storage unit 1 stores the structured document such as XML document in a disc. The expanding unit 2 analyzes the structure of the structured document such as the XML document and expand to the object holding unit 3 as an object. This is called DOM tree expansion.

The object holding unit 3 is a memory which holds an object expanded by the expanding unit 2. The processing unit 4 is a program which offers the API group specified to W3C (DOM processor), which processes an object of the object holding unit 3 following an instruction of the user application 6. The user application 6 handles expanded structured document.

For processing by the processing unit (DOM processor) 4, the structure of the XML document, which is the structured document, is analyzed by the expanding unit (DOM tree expanding unit) 2 and an object (DOM tree) is expanded to the object holding unit (memory) 3. The XML document is a series text and the DOM tree expanded as an object is separated to respective elements and those elements are stored according to data structure described with the tag. Hereinafter, an object expanded on the memory by analyzing the structure of the structured document such as the XML document is called "object". Because the structural analysis becomes unnecessary by using the expanding unit 2 and the processing unit 4, the user application 6 can be made easily.

FIG. 2 is a conventional processing flow chart, which will be described through processings S11-S12.

S11: If various kinds of instructions about processing is dispatched from the user application 6, the expanding unit 2 expands the entire structured document to the object holding unit (memory) 3 and the processing proceeds to processing S12.

S12: The processing unit 4 carries out various kinds of processings following an instruction from the user application 6 and terminates this processing.

However, because as shown in FIG. 2, the DOM processor, which is the conventional expanding unit 2, expands the entire XML document on the memory, load on the central processing unit (CPU) of the expanding unit 2 is so high that a necessary amount of the main memory is large, which is a problem to be solved. The parse document object model (PDOM) is available for solving this problem.

FIG. 3 is an explanatory diagram of a conventional parse document object model (PDOM). The conventional structured document processing system includes a disc 1, an expanding unit 2, an object holding unit 3, a processor unit 4, and user application 6. After the structured document 10 is expanded as an object, this system converts the object to a tree structure document 10B composed of series binary data and stores in the structured document storage unit 1. A partial tree 11, which is part of this tree structure document 10B, is cached on the memory which is the object holding unit 3 so as to process the object (DOM tree).

FIG. 12 is a flow chart of conventional PDO processing, which will be described about processings S21-S23.

S21: If an instruction about various kinds of processings is received from the user application 6, the expanding unit 2 expands the entire structured document 10 in the structured document storage unit 1 to the tree structure document 10B, stores in the structured document storage unit 1 and the processing proceeds to processing S22.

S22: The processing unit 4 reads out partial tree 11 which is part of the tree structure document 10B for use for a processing instructed by the user application 6 from the structured document storage unit 1 onto a memory which is the object holding unit 3 and the processing proceeds to processing S23.

S23: The processor unit 4 carries out various kinds of processing according to an instruction from the user application 6 and terminates this processing.

However, the above-described conventional system has following problems. If the structure document such as the XML document is large, processing expanded on the DOM tree occupies most of the processing. The DOM tree requires a capacity five to ten times the structured document such as its original XML document, so that the structured document such as the XML document larger than several tens MB cannot be handled by the conventional DOM processor. Although currently available PDOM has solved this problem, its CPU load for initial DOM tree expansion is high also. Further, because a binary which is controlled separately from the structured document such as the XML document is generated, integrated control of data is impossible.

SUMMARY OF THE INVENTION

The present invention provides a structured document processing system, method, program and recording medium in which the structured document is perceived as a tree structure, that tree is controlled by dividing to plural partial trees and nothing but part of the structured document is expanded so as to achieve a high processing performance.

The structured document processing system of the present invention comprises a structured document storage unit for storing a structured document; a partial tree control unit which conceives the structured document stored in the structured document storage unit as a tree structure and controls the tree structure with divided partial trees; an expanding unit which acquires part of the structured document corresponding to a partial tree notified from the partial tree control unit from the structured document storage unit, analyzes part of the acquired structured document from viewpoints of its structure and expands as a hierarchical object (node object) in tree structure; and a processing unit for processing the object expanded by the expanding unit following an instruction from a user application. Thus, because nothing but part of the structured document is expanded, a high processing performance can be achieved.

Here, the partial tree control unit includes a position holding unit for holding the position of a region surrounded by specific tags in the structured document as the position of the partial tree, and the expanding unit acquires part of the structured document corresponding to an arbitrary partial tree by using position information held by the position holding unit and expands as an object and transfers the expanded object to the processing unit. Because nothing but a region surrounded by specific tags is expanded, a high processing performance can be achieved.

The partial tree control unit comprises: a position holding unit for holding the position of a region surrounded by specific tags in the structured document as the position of the partial tree; and a caching control unit for caching an object of part of the structured document corresponding to the partial tree expanded by the expanding unit. When a portion to be processed by the processing unit has no caching control unit, the expanding unit acquires part of the structured document corresponding to the partial tree by using the position information of the position holding unit, acquires part of the structured document corresponding to the partial tree, expands as an object and transfers the expanded object to the processing unit. Thus, the processing performance for a portion to be processed held by the caching control unit can be raised.

The partial tree control unit includes a structured document dividing unit for dividing the structured document to one or plural partial tree units and storing in the structured document storage unit. Thus, the structured document in the structured document storage unit can be controlled as an individual document, so that a separated document can be prevented from affecting other documents.

The structured document processing system further comprises: an inversion unit which inverts an object of a partial tree changed by the processing unit and stores in the structured document storage unit; and a copy unit which copies a portion of a structured document in the structured document storage unit not changed by the processing unit and generates an updated structured document by gathering with the portion stored by the inversion. Because the inverted portion is only the changed partial tree, a high processing performance can be achieved.

Further, the present invention provides a structured document processing method comprising: structured document holding step for storing the structured document in the structured document storage unit; partial tree control step which conceives a structured document stored in the structured document storage unit as a tree structure by means of the partial tree control unit and controls the tree structure by dividing into plural partial trees; expanding step for acquiring part of the structured document corresponding to the partial tree notified through the partial tree control step from the structured document storage unit and expanding as a hierarchical object in the tree structure by analyzing part of the acquired structured document; and processing step for processing the expanded object following an instruction from user application by means of the processing.

Still further, the present invention provides a structured document processing program for making computer to execute: structured document holding step for storing the structured document in the structured document storage unit; partial tree control step which conceives a structured document stored in the structured document storage unit as a tree structure and controls the tree structure by dividing into plural partial trees; expanding step for acquiring part of the structured document corresponding to the partial tree notified through the partial tree control step from the structured document storage unit and expanding as a hierarchical object in the tree structure by analyzing part of the acquired structured document; and processing step for processing the expanded object following an instruction from user application.

Yet still further, the present invention provides a recording medium which records a computer readable program for making computer to execute: structured document holding step for storing the structured document in the structured document storage unit; partial tree control step which conceives a structured document stored in the structured document storage unit as a tree structure and controls the tree structure by dividing into plural partial trees; expanding step for acquiring part of the structured document corresponding to the partial tree notified through the partial tree control step from the structured document storage unit and expanding as a hierarchical object in the tree structure by analyzing part of the acquired structured document; and processing step for processing the expanded object following an instruction from user application.

In the meantime, basically, the details of the structured document processing method, program and recording medium of the present invention are the same as the structured document processing system.

The above and other objects, features, and advantages of the present invention will become more apparent from the following detailed description with reference to the drawings.

BRIEF DESCRIPTION OF THE DRAWINGS

FIG. 11 is an explanatory diagram for comparison of a conventional technology with the present invention in terms of their performance.

DETAILED DESCRIPTION OF THE PREFERRED EMBODIMENTS

Figure 5:
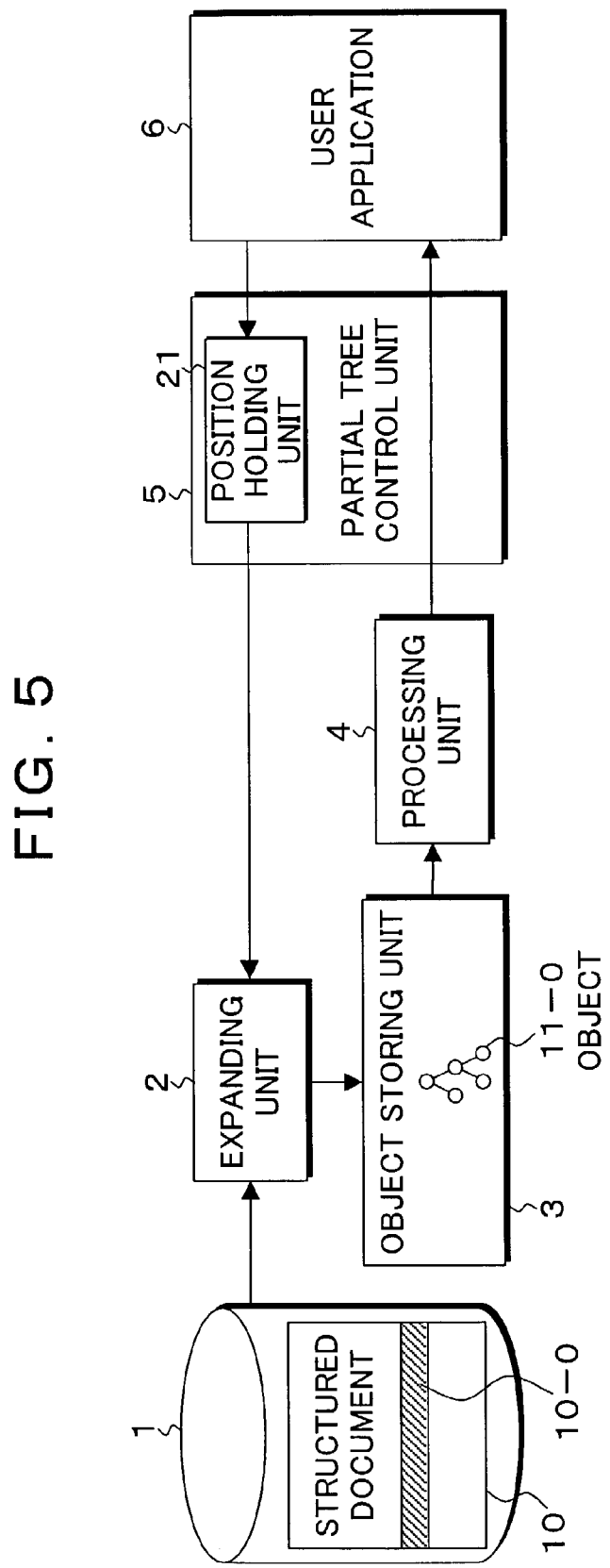
FIG. 5 is an explanatory diagram of an embodiment of the structured document processing system of the present invention.

FIG. 5 is an explanatory diagram of the structured document processing system of the present invention. The structured document storage unit 1 is a disc, which stores structured document 10 such as the XML document. Although usually, the structured document holding portion 1 is the disc of system itself, it may be a disc of other system or other medium through a memory or network. The expanding unit 2 is a CPU, which analyzes the structure of the structured document 10 such as the XML document and expands as hierarchical objects in tree structure of a DOM tree known as document object model (DOM). The object holding unit 3 is a memory, which holds objects expanded by the expanding unit 2. The processing unit 4 is a program which offers the API group specified to W3C (DOM processor), which processes an object in the object holding unit 3 according to an instruction of the user application 6.

The partial tree control unit 5 conceives the structured document 10 such as the XML document as a tree structure and controls that tree structure with divided into partial trees. Thus, the partial tree control unit 5 includes a position holding unit 21. The position holding unit 21 ensures which position each partial tree exists in the structured document such as the XML document. More specifically, the position holding unit 21 holds the start position of a region surrounded by specific tags in the structured document 10 as the position of a partial tree. For the reason, the expanding unit 2 acquires part 10-0 of the structured document 10 corresponding to an arbitrary partial tree by using the position information of the position holding unit 21 and expands to an object 11-0. Meanwhile, if the expanding unit 2 or the processing unit 4 can be provided with the function of the object holding unit 3, the object holding unit 3 can be omitted.

The processing of FIG. 5 will be described. If an instruction about various kinds of processing is received from the user application 6, the position holding unit 21 of the partial tree control unit 5 specifies the instructed partial tree of the structured document 10 in the structured document storage unit 1 and notifies the expanding unit 2.

The expanding unit 2 fetches out a portion 10-0 corresponding to the partial tree of the structured document 10 specified by the structured document storage unit 1, expands as an object 11-0 and stores in the object holding unit 3. The processing unit 4 executes various kinds of references or changes following an instruction from the user application 6 by using an object 11-0 equivalent to an expanded partial tree held by the object holding unit 3 and then notifies the user application 6 of its result.

Figure 6:
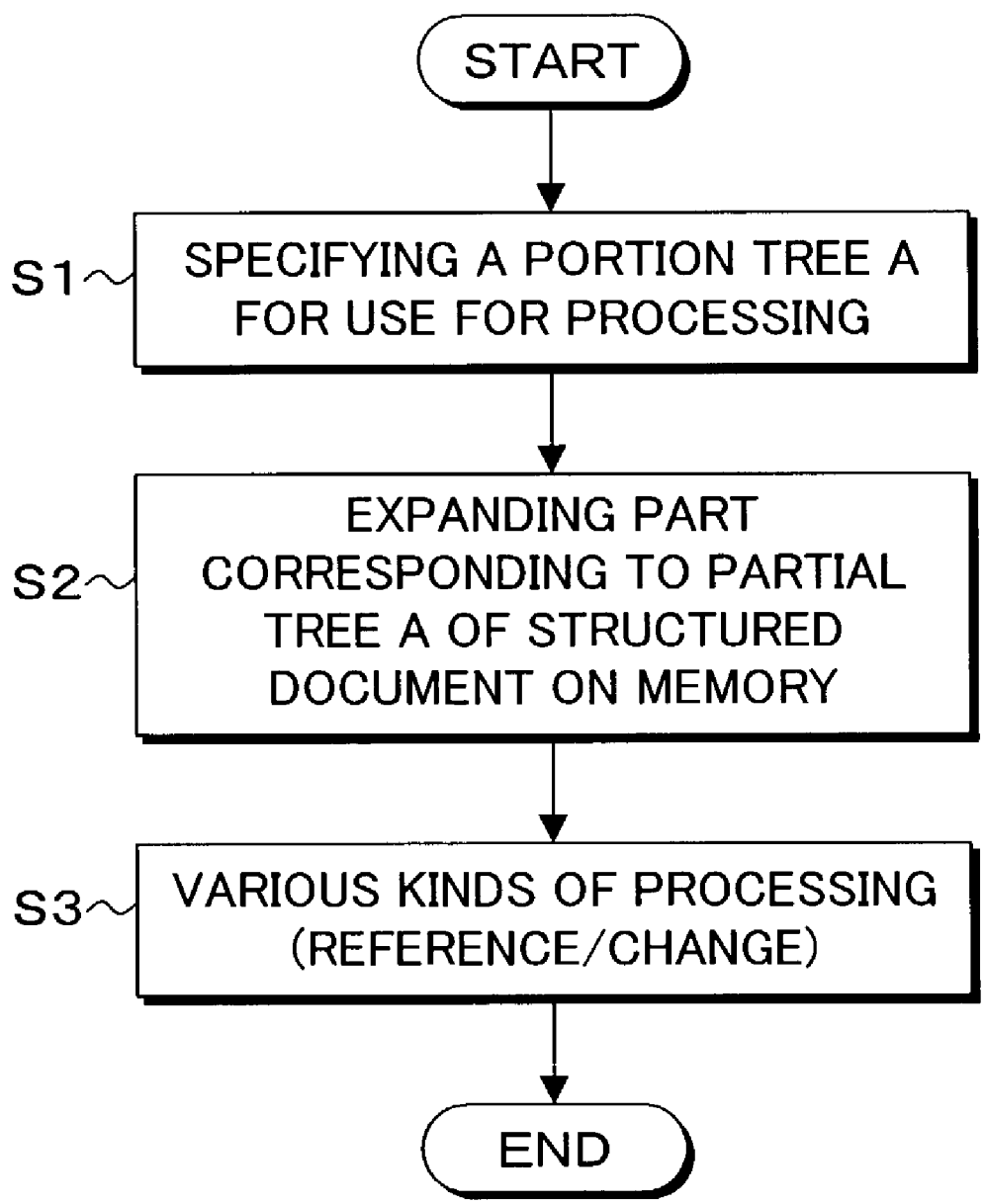
FIG. 6 is a flow chart of the structured document processing of the embodiment of FIG. 5.

FIG. 6 is a flow chart of the structured document processing of the present invention, which will be described according to processings S1-S3.

S1: If an instruction about various kinds of processings is received from the user application 6, the partial tree control unit 5 specifies a document position corresponding to the instructed partial tree in the structured document 10 of the structured document storage unit 1 and the processing proceeds to processing S2.

S2: The expanding unit 2 reads out part 10-0 corresponding to the partial tree of the structured document and expands as the object (DOM tree) 11-0 to the object holding unit 3. Then, the processing proceeds to processing S3.

S3: The processing unit 4 executes various kinds of processings, namely references or changes following an instruction from the user application 6 for the object 11-0 and terminates this processing.

The partial tree control unit 5, which conceives the structured document such as the XML document as a tree structure and controls this tree structure with divided plural partial trees, expands part of the structured document such as the XML document corresponding to an accessed partial tree as an object and then transfers it to the processing unit 4, so as to eliminate the necessity of expanding the entire structured document 10. Because only part of the structured document such as the XML is expanded, the CPU load of the expanding unit 2 is low and the necessary amount of the main memory is small.

Figure 7:
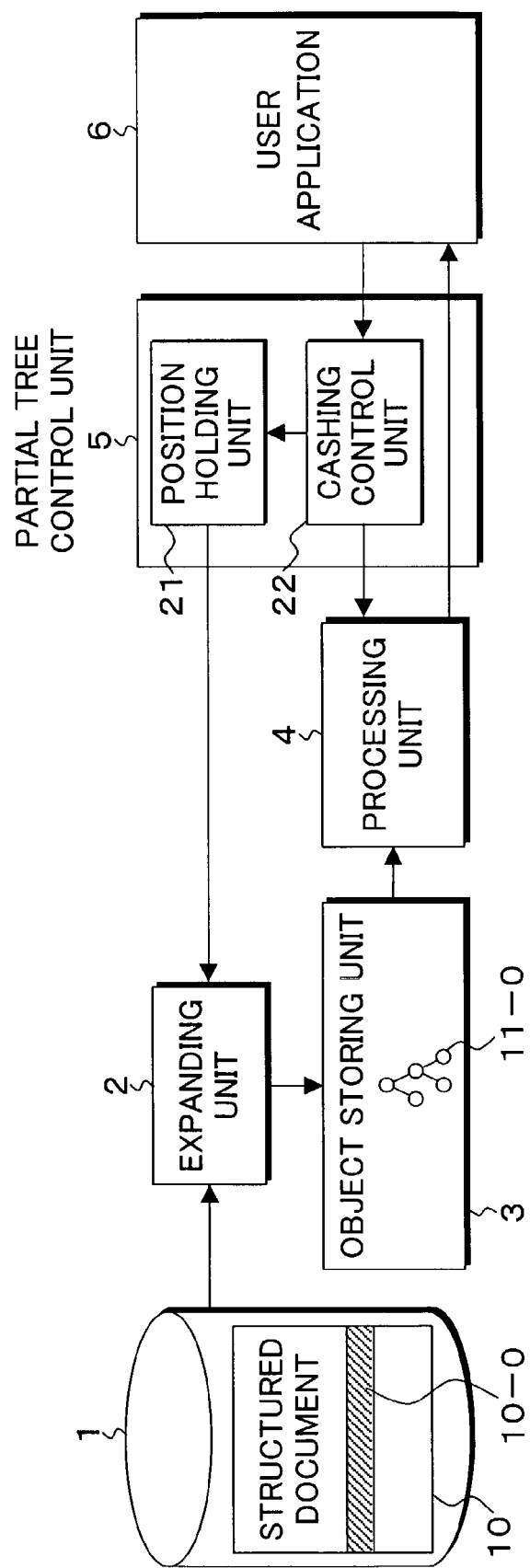
FIG. 7 is an explanatory diagram of the embodiment of the present invention provided with a caching control unit.

FIG. 7 is an explanatory diagram of the structured document processing system having a caching control unit. The structured document processing system includes a structured document storage unit 1, an expanding unit 2, an object holding unit 3, a processing unit 4, a partial tree control unit 5 and user application 6. Further, the caching control unit 22 is added to the partial tree control unit 5 as well as the position holding unit 21. The caching control unit 22 controls caching of an object expanded by the expanding unit 2 and held by the object holding unit 3.

Figure 1:
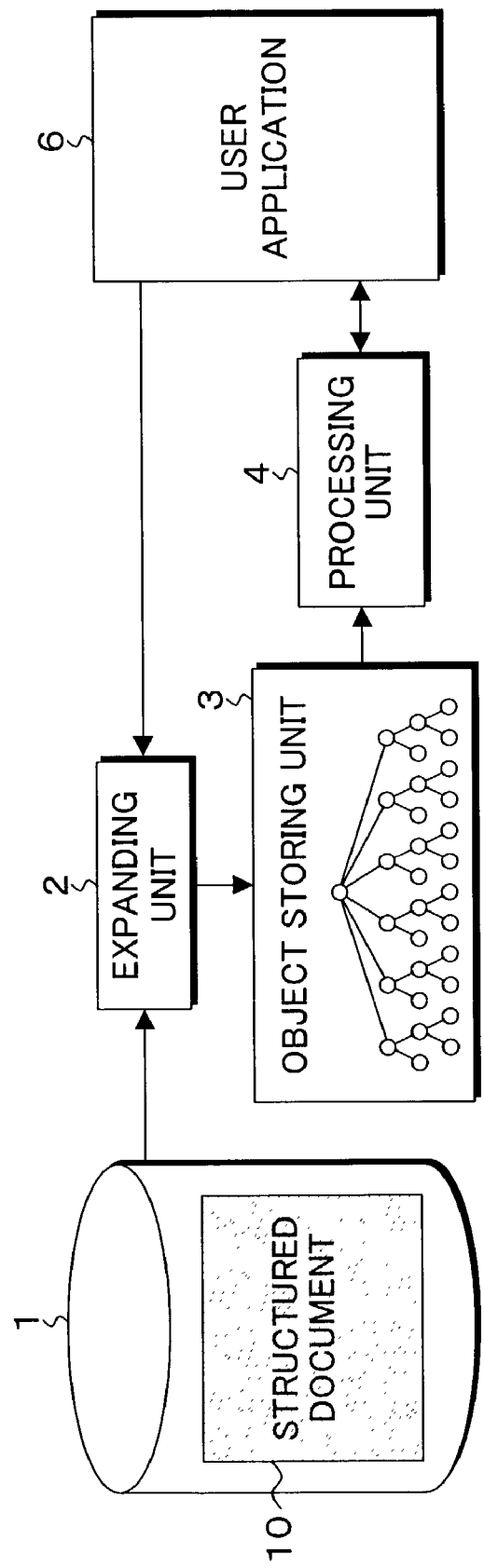
FIG. 1 is an explanatory diagram of a conventional example.
Figure 2:
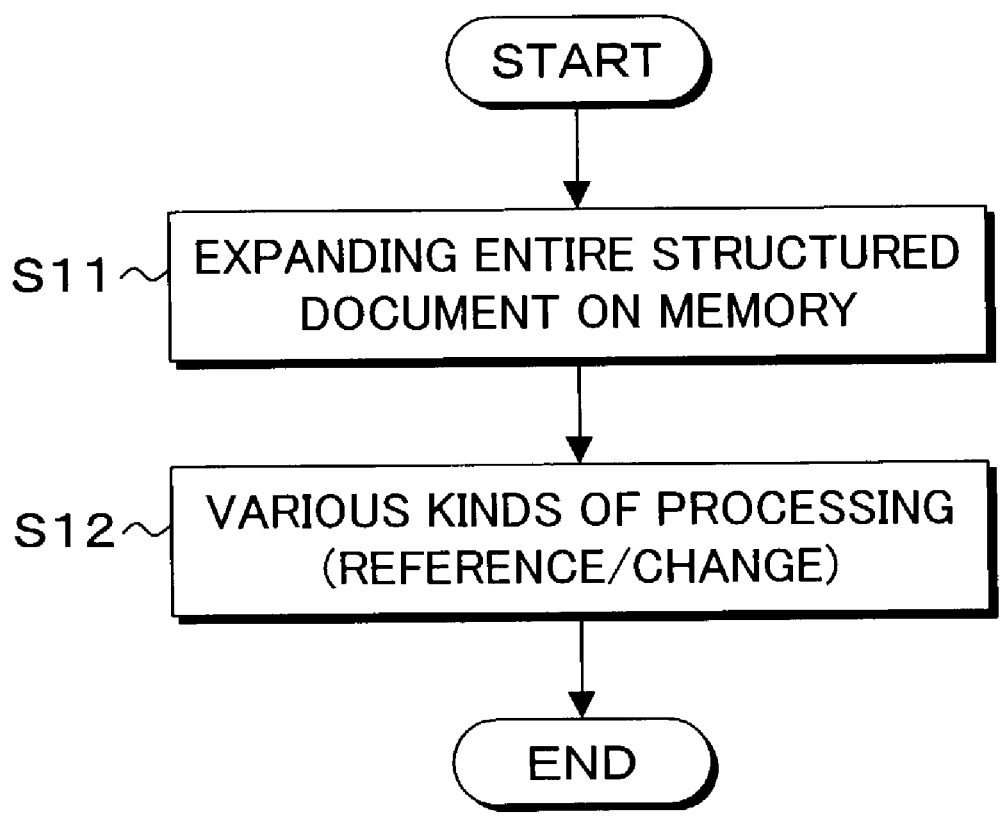
FIG. 2 is a conventional processing flow chart.
Figure 3:
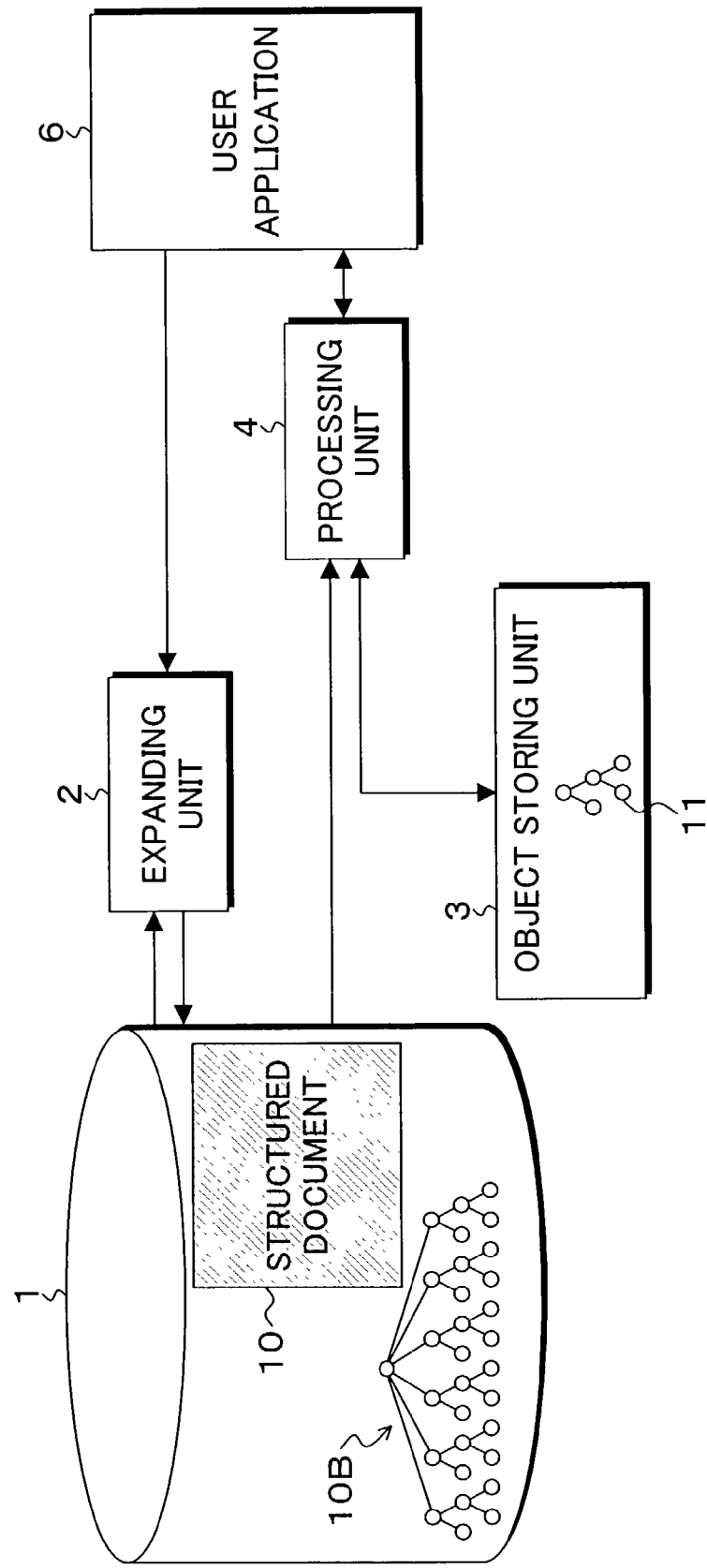
FIG. 3 is an explanatory diagram of the conventional PDOM processing.
Figure 4:
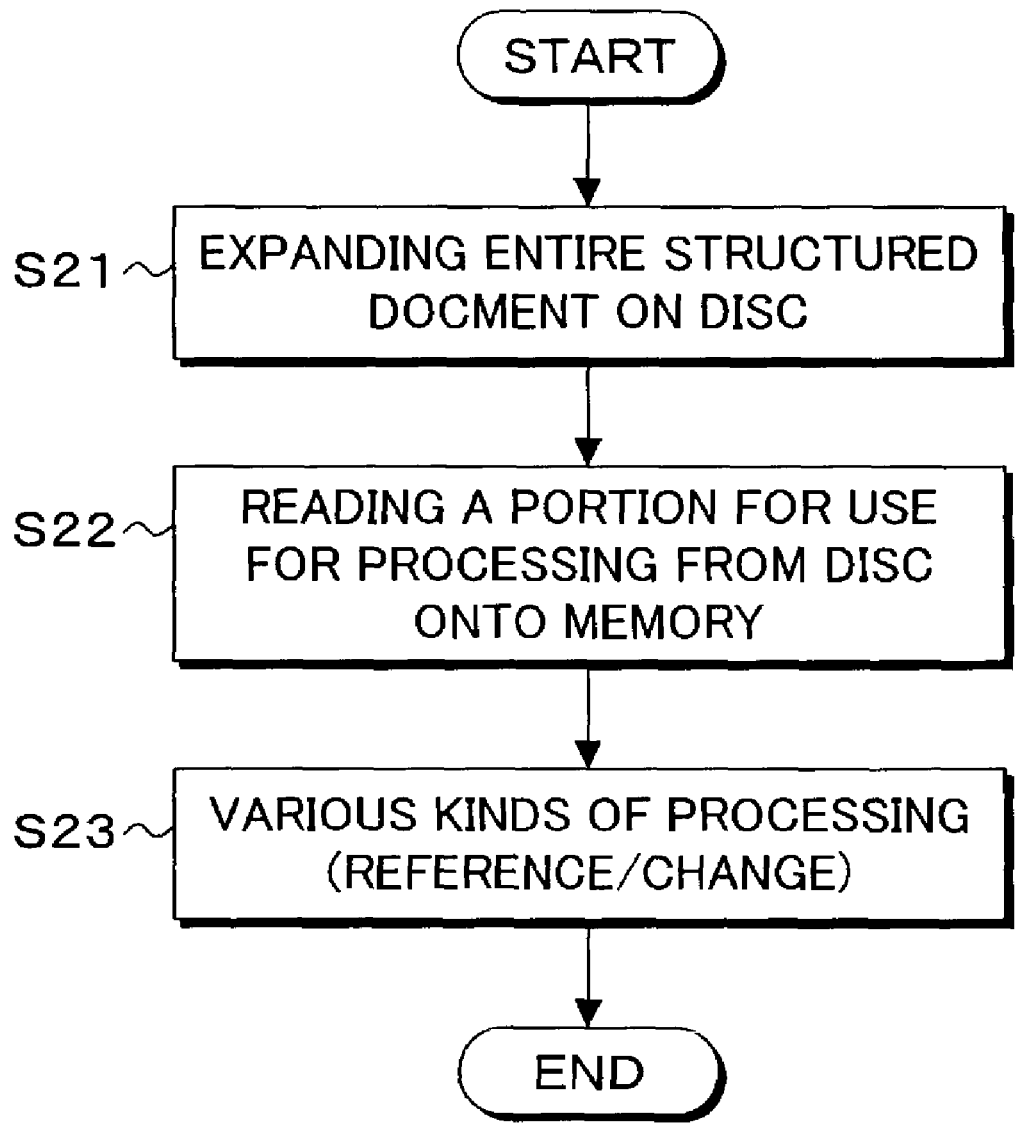
FIG. 4 is a flow chart of the conventional PDOM processing.

The flow of processing by the caching control unit 22 in FIG. 4 is as follows. If a request for processing is received from the user application 6, the partial tree control unit 5 investigates whether or not the partial tree object 11-0 which is to be used in the requested processing has been expanded with the caching control unit 22. If the partial tree object 11-0 which is a processing object has been already expanded, the processing unit 4 processes the object 11-0 in the object holding unit 3 and notifies the user application 6 of its result. On the other hand, if an object 11-0 of the partial tree, which is a processing object, has not been expanded yet, the position holding unit 21 notifies a portion 10-0 corresponding to a given partial tree to the expanding unit 2 and reads out a part 10-0 corresponding to the partial tree from the structured document 10 in the structured document storage unit 1 by means of the expanding unit 2. This is expanded as the object 11-0 and that object is held by the object holding unit. Then, it is processed by the processing unit 4 and notified to the user application 6. After that, the object 11-0 held by the object holding unit 3 is related to the caching control unit 22.

Figure 8:
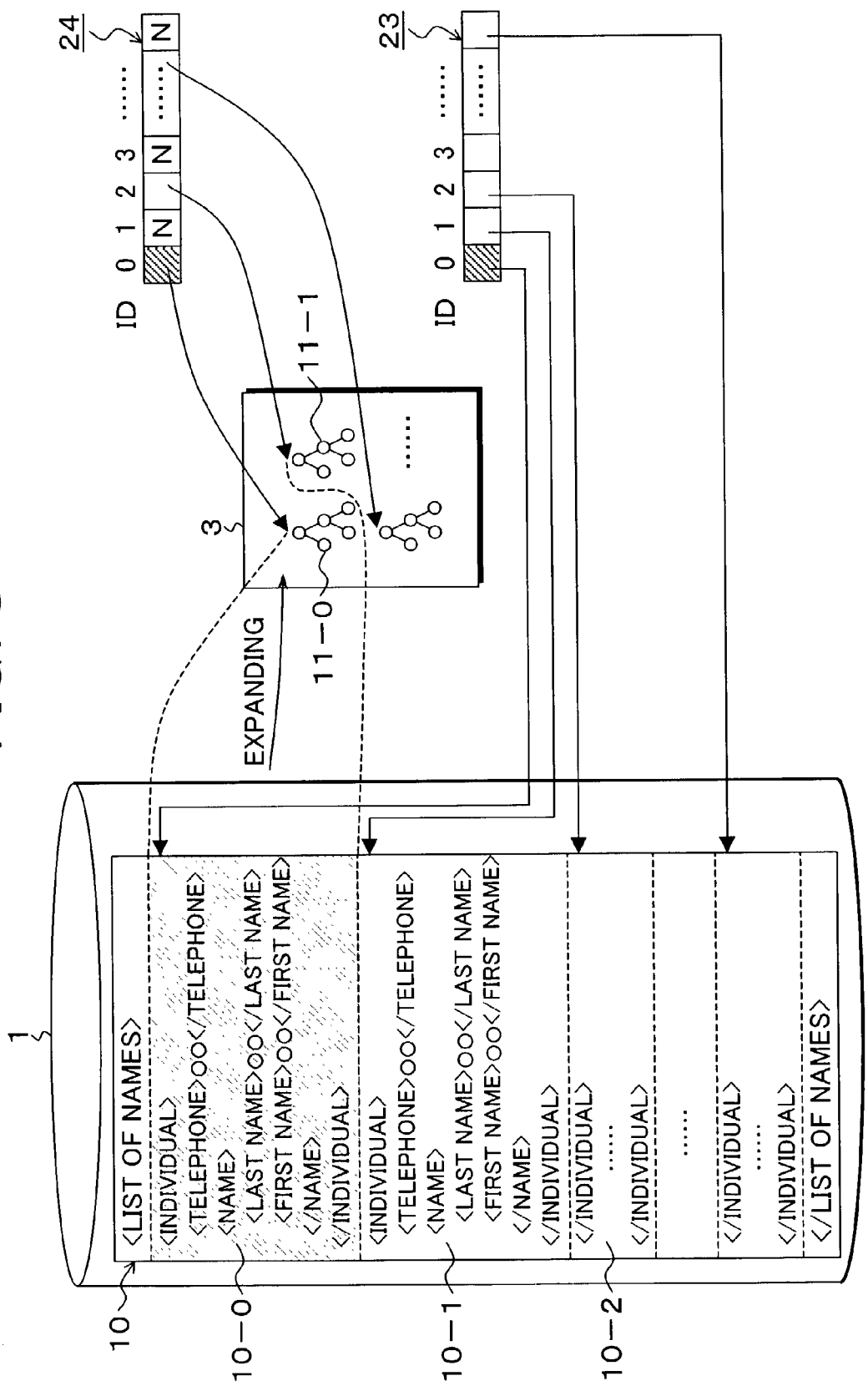
FIG. 8 is an explanatory diagram of a partial tree position list and partial caching list of the present invention.

FIG. 8 is an explanatory diagram of an example of the partial tree position list controlled by the position holding unit 21 in FIG. 7 and the partial tree caching list controlled by the caching control unit 22. The partial tree position list controlled by the position holding unit 21 of FIG. 5 is the same as this. The partial tree position list 23 in the position holding unit 21 holds information about which position (starting position) the partial tree for use for a processing requested by the user application 6 exists in the structured document. The partial caching list 24 in the caching control list 22 holds position information for controlling an object expanded on the object holding unit 3. That is, in the partial tree list 23, ID is allocated corresponding to the partial tree and the starting position (starting address) in the structured document of the partial tree is stored for each ID. In this example, if the partial tree ID=0 is specified, the starting position in the structured document 10 of the partial tree ID=0 is obtained from the partial tree position list 23, a region 10-0 of a corresponding structured document 10 is read out from the structured document storage unit 1 and expanded as the object 11-0 by the expanding unit 2. The object 11-0 of such an expanded partial tree is related to the partial tree ID=0 on the partial caching list 24 by the caching control unit 22 in FIG. 74. Here, "N" in the partial caching list 24 means "NULL", which means that a corresponding object has not been cached. In the meantime, the partial tree position list 23 and the partial tree caching list 24 may hold not only the starting position of the structured document but also the starting position and size of each ID.

Figure 9:
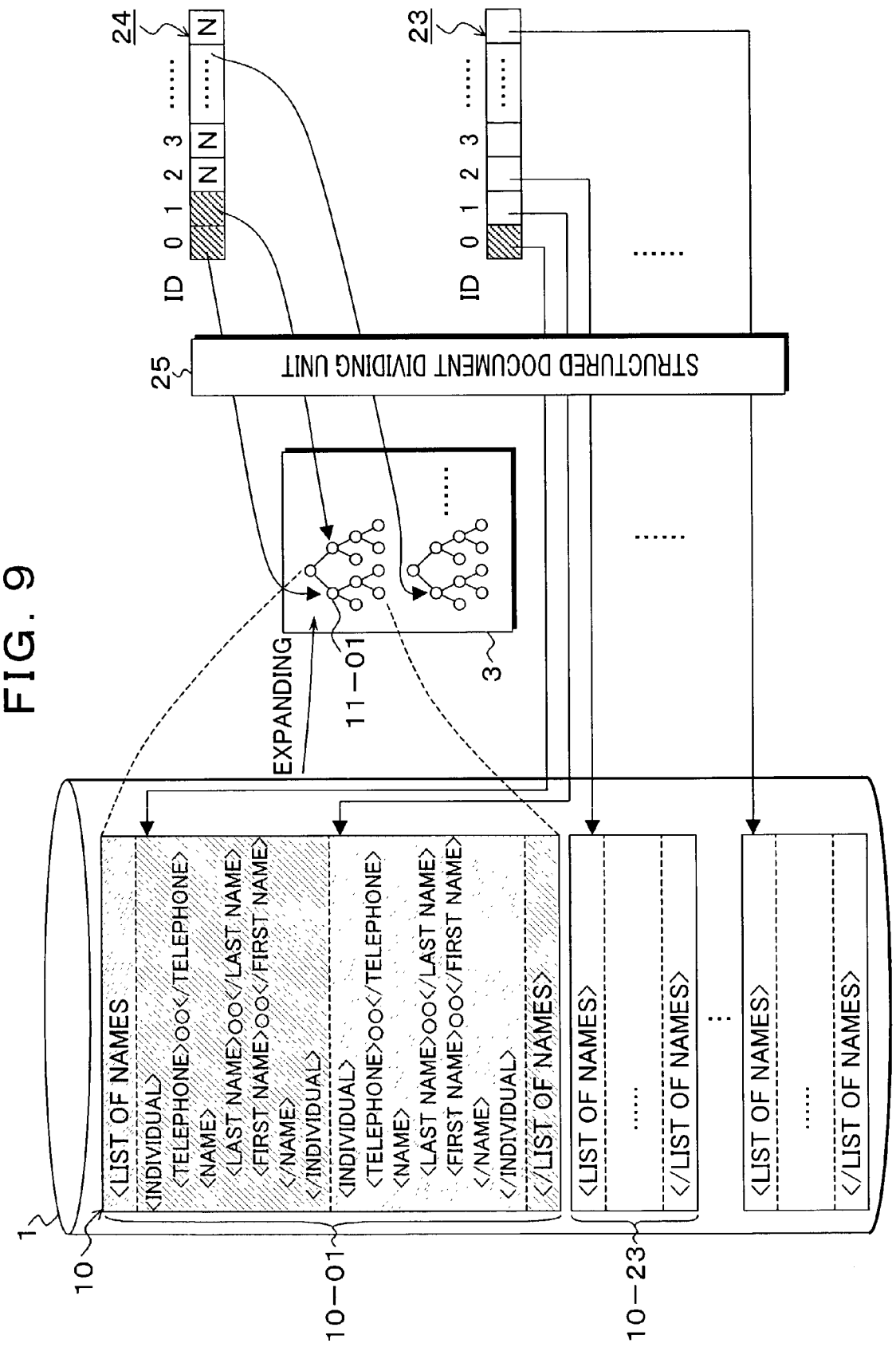
FIG. 9 is an embodiment for controlling the structured document by dividing it to plural pieces.

FIG. 9 is an explanatory diagram of the partial tree control unit 5 for controlling the structured document by dividing to plural regions. The partial tree control unit 5 includes a structured document dividing unit 25 as well as the partial tree position list 23 and the partial tree caching list 24. In this example, the structured document dividing unit 25 divides the structured document 10, into every two partial trees. That is, the structured document 10 is divided into divided structured documents 10-01, 10-11, under a pair of partial tree IDs like (ID=0, ID=1), (ID=2, ID=3), . . . in the partial tree position list 23. Thus, if use of the partial tree with partial tree ID=0 is specified to the partial tree position list 23, the structured document dividing unit 25 expands a divided structured document 10-01 in a region at a position specified by the partial tree ID=0 and the partial tree ID=1 all at once and holds the expanded object 11-01 in the object holding unit 3. The partial tree object 11-01 of the divided structured document expanded in this way is related to the partial tree caching list 24 via the structured document dividing unit 25. The unit for division by the structured document dividing unit 25 is set up arbitrarily depending on processing efficiency of expansion. Controlling the structured document by dividing into plural regions in such a way prevents a change in a document from affecting other document, for example, blocking a shift of digit or the like. Further, expanding the structured document by some unit all at once can achieve an more effective expansion than expanding by the unit of the partial tree several times.

Figure 10:
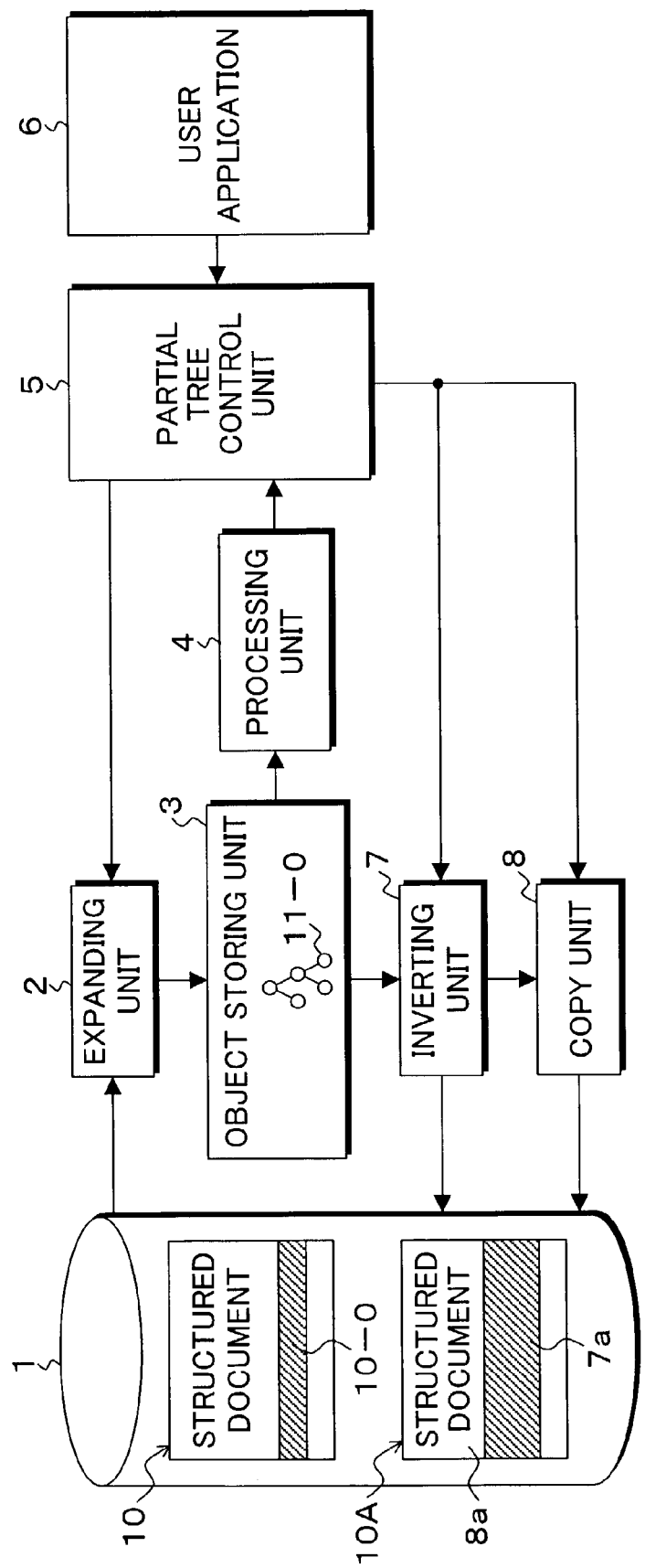
FIG. 10 is an explanatory diagram of an embodiment in which the content of changes of the expanded object is reflected on the structured document.

FIG. 10 is an explanatory diagram of other embodiment in which a change in the content of the structured document is reflected on the structured document. The structured document processing system includes a structured document storage unit 1, an expanding unit 2, an object holding unit 3, a processing unit 4, a partial tree control unit 5, and user application 6. Additionally, an inversion unit 7 and a copy unit 8 are added. The inversion unit 7 inverts a partial tree object changed by the processing unit 4 to its original structured document portion and stores in the structured document storage unit 1. The copy unit 8 copies a portion of the structured document 10 in the structured document storage unit 1 not changed by the processing unit 4 and generates an updated structured document 10A by gathering with the portion stored after inversion with the inversion unit 7.

Next, the processing shown in FIG. 10 will be described. If an instruction about processing for changing the content is dispatched from the user application 6, the partial tree control unit 5 specifies the partial tree of an instructed structured document 10 in the structured document storage unit 1 and notifies the expanding unit 2. The expanding unit 2 takes out a portion 10-0 corresponding to the partial tree of the specified structured document from the structured document storage unit 1, expands as the object 11-0 of the partial tree and transfers to the object holding unit 3. The processing unit 4 carries out change processing according to an instruction from the user application 6 by using the portion corresponding to the expanded object 11-0 held by the object holding unit 3. The inversion unit 7 inverts the object 11-0 of a changed partial tree to a structured document and stores in the updated structured document 10A in the structured document storage unit 1 as inverted data 7*a*. A region other than the changed partial tree in the original structured document is copied by the copy unit 8 and stored in the updated structured document 10A in the structured document storage unit 1 as copied data 8*a*. Although in the embodiment shown in FIG. 10, the inverted data 7*a* and the copied data 8*a* are stored separately and combined, it is permissible to copy the entire structured document 10 as the updated structured document 10A and then overwrite the changed inverted data 7*a*.

FIG. 11 is an explanatory diagram of comparison between the conventional technology and the present invention from viewpoints of their performance. Because the conventional technology expands the entire structured document on a memory, load on the CPU of the expanding unit 2 is increased so that the consumption amount of the memory is also increased. Because according to the conventional PDOM method, the entire structured document on the structured document storage unit is expanded and stored in the structured document storage unit, the CPU load of initial expansion is increased while the consumption amount of the memory is decreased. Contrary to this, according to the present invention, only part of the structured document is expanded and therefore, the load on the CPU of the expanding unit is decreased while the consumption amount of the memory is also decreased.

Next, the hardware resource achieved by computer of the present invention and program install will be described. The structured document storage unit 1, the expanding unit 2, the object holding unit 3, the processing unit 4, the partial tree control unit 5, the position holding unit 21, the caching control unit 22, and the structured document dividing unit 25 of the above-described embodiment can be constructed with program and stored in the main storage unit by executing the main control unit (CPU). This program is processed by an ordinary computer. This computer is constituted of such hardware as main control unit, main storage unit, file unit, display unit, input unit which is an input means such as a keyboard. The program of the present invention is installed in this computer. That program is stored in a portable recording (memory) medium such as floppy disc, photomagnetic disc and installed to a file unit through a drive unit for accessing a recording medium included in computer or through network such as LAN. Then, a necessary program step is read out from this file unit to the main storage unit and executed by the main control unit. Installing this program in the computer provides a structured document processing system capable of acquiring a high processing performance by allowing only part of the structured document to be expanded.

As described in the above embodiments, use of the partial tree control unit enables realization of the DOM processor which eliminates a necessity of expanding the entire structured document such as the XML document on a memory and operates with a low CPU load by saving of its main memory. Particularly, a high performance is secured in application for transferring the XML document to other system after only part thereof is changed, added or deleted.

Further, the performance of the DOM processor which is a basic application for handling the XML document can be raised. The problems of an existing DOM processor requested to be solved, that is, high load on the CPU and tremendous main memory can be solved.

As described above, the present invention has following effects.

(1) The expanding unit acquires part of a structured document corresponding to a partial tree notified from the partial tree control unit from the structured document storage unit, expands as the partial tree object and transfers the expanded object to the processing unit. Thus, a high processing performance can be achieved because nothing but part of the structured document is expanded.

(2) Using position information held by the position holding unit for holding the position of a region surrounded with specific tags in the structured document in the partial tree control unit, part of the structured document corresponding to the partial tree is acquired and expanded as a partial tree object and the expanded object is transferred to the processing unit. Thus, a high processing performance can be obtained because nothing but the region surrounded by the specific tags is expanded.

(3) Because the expanded object is transferred to the processing unit and held in the caching control unit, the processing performance for a portion which is a processing object held by the caching control unit can be raised.

(4) Because the structured document dividing unit divides a structured document into multiple structured documents and store in the structured document storage unit, a change in a separated structured document can be blocked from affecting other structured document.

(5) When an expanded object is changed by the processing unit, the partial tree of that changed object is inverted with the inversion unit while the structured document of remaining unchanged portion is copied directly with the copy unit. Thus, only the changed partial tree object is inverted in order to generate the structured document containing the changed portion. Consequently, a high processing performance can be obtained.

In the meantime, the present invention includes appropriate modifications without damaging its purpose and advantages. Additionally, the present invention is not restricted by numerals described in the above embodiments.

What is claimed is:

1. A structured document processing system comprising:
   a structured document storage unit for storing a structured document;
   a partial tree control unit which conceives the structured document stored in said structured document storage unit as a tree structure and controls said tree structure with divided partial trees;
   an expanding unit which acquires part of the structured document corresponding to a partial tree notified from said partial tree control unit from said structured document storage unit, analyzes part of the acquired structured document from viewpoints of its structure and expands the pad of the document by creating a pad of a tree, which corresponds to part of the tree structure stored in said structured document storage unit, with a hierarchical object tree structure where positions for the partial trees as specified in the notification for the document are used to retrieve the part of the document and create the partial tree;
   a processing unit for processing the object expanded by said expanding unit following an instruction from a user application, in a state in which the entire structured document is held as it is without processing;
   an inversion unit which inverts the object of the partial tree changed by said processing unit and stores the inverted object of the partial tree in said structured document storage unit; and
   a copy unit which copies a portion of the structured document in said structured document storage unit not changed by said processing unit and generates an updated structured document by gathering the portion stored after said inversion said inversion unit,
   wherein said partial tree, which includes at least a parent node and child nodes, is a part of an entire tree.

2. The structured document processing system as claimed in claim 1 wherein said partial tree control unit includes a position holding unit for holding the position of a region surrounded by specific tags in the structured document as the position of the partial tree, and
   said expanding unit acquires part of the structured document corresponding to an arbitrary partial tree by using position information held by said position holding unit and expands as an object and transfers the expanded object to said processing unit.

3. The structured document processing system as claimed in claim 1 wherein said partial tree control unit comprises:
   a position holding unit for holding the position of a region surrounded by specific tags in the structured document as the position of the partial tree; and
   a caching control unit for caching an object of part of the structured document corresponding to the partial tree expanded by said expanding unit,
   when a portion to be processed by said processing unit has no caching control unit, said expanding unit acquiring part of the structured document corresponding to the partial tree by using the position information of said position holding unit, expanding as an object and transferring the expanded object to said processing unit.

4. The structured document processing system as claimed in claim 2 or 3 wherein said partial tree control unit includes a structured document dividing unit for dividing the structured document into one or plural partial tree units and storing in said structured document storage unit.

5. The structured document processing method as claimed in claim 1 wherein, the structured document retains its original structure.

6. A structured document processing method comprising:
   storing the structured document in the structured document storage unit;
   conceiving a structured document stored in said structured document storage unit as a tree structure and controls said tree structure by dividing into plural partial trees;
   expanding by acquiring part of the structured document corresponding to the partial tree notified through said conceiving from said structured document storage unit and expanding the part of the document by creating a part of a tree, which corresponds to part of the tree structure stored in said structured document storage unit, with a hierarchical object tree structure by analyzing part of the acquired structured document where positions for the partial trees as specified in the notification for the document are used to retrieve the part of the document and create the partial tree;
   processing the expanded object following an instruction from user application via the processing unit, in a state in which the entire structured document is held as it is without processing;
   inverting the object of the partial tree changed by said processing to the structured document and storing the inverted object of the partial tree in said structured document storage unit; and
   copying, in said structured document storage unit, a portion of the structured document not changed by said processing and generating an updated structured document by gathering the portion stored after said inversion, wherein said partial tree, which includes at least a parent node and child nodes, is a part of an entire tree.

7. The structured document processing method as claimed in claim 6 wherein said conceiving is for holding the position of a region surrounded by specific tags in the structured document as the position of the partial tree and said expanding is for, by using the position information of said position holding unit, acquiring part of the structured document corresponding to any partial tree, expanding as an object and transferring the expanded object to said processing unit.

8. The structured document processing method as claimed in claim 6 wherein said conceiving comprises:

holding the position of a region surrounded by specific tags in the structured document as the position of the partial tree; and caching part of the structured document corresponding to a partial tree expanded in said expanding, when a portion to be processed in said processing is not cached, said expanding acquiring part of the structured document corresponding to a partial tree using position information of said position holding unit, expanding as an object and transferring the expanded object to said processing unit.

9. The structured document processing method as claimed in claim 7 or 8 wherein said conceiving includes dividing the structured document to plural partial tree units and storing in said structured document storage unit.

10. A recording medium which records a computer readable program for making computer to execute:

storing the structured document in the structured document storage unit;

conceiving a structured document stored in said structured document storage unit as a tree structure and controls said tree structure by dividing to plural partial trees;

expanding by acquiring part of the structured document corresponding to the partial tree notified through said conceiving from said structured document storage unit and expanding the part of the document by creating a part of a tree, which corresponds to part of the tree structure stored in said structured document storage unit, with a hierarchical object tree structure by analyzing part of the acquired structured document where positions for the partial tree as specified in the notification for the document are used to retrieve the part of the document and create the partial tree;

processing the expanded object following an instruction from user application, in a state in which the entire structured document is held as it is without processing;

inverting the object of the partial tree changed by said processing to the structured document and storing the inverted object of the partial tree in said structured document storage unit; and copying, in said structured document storage unit, a portion of the structured document not changed by said processing and generating an updated structured document by gathering the portion stored after said inversion, wherein said partial tree, which includes at least a parent node and child nodes, is a part of an entire tree.

11. A method, comprising:

storing a structured document in a storage unit as a tree structure;

creating a partial tree corresponding to parts of the tree structure based on acquired parts of the tree structure which are analyzed to create the partial tree;

processing the partial tree following an instruction from a user application;

inverting an object of the partial tree changed by the processing to the structured document and storing the inverted object of the partial tree in the structured document storage unit; and copying, in said storage unit, a portion of the structured document not changed by the processing and generating an updated structured document by gathering the portion stored after said inversion, wherein said partial tree, which includes at least a parent node and child nodes, is a part of an entire tree.

* * * * *

UNITED STATES PATENT AND TRADEMARK OFFICE
CERTIFICATE OF CORRECTION

| | | |
|---|---|---|
| PATENT NO. | : 7,451,390 B2 | Page 1 of 1 |
| APPLICATION NO. | : 10/237177 | |
| DATED | : November 11, 2008 | |
| INVENTOR(S) | : Noriko Itani | |

It is certified that error appears in the above-identified patent and that said Letters Patent is hereby corrected as shown below:

On the Title Page, Item (30) (Foreign Application Priority Data), Line 1, change "Sep. 20, 2001" to --Sep. 10, 2001--.

Column 9, Line 53, after "expands the" change "pad" to --part--.

Column 9, Line 53, after "by creating a" change "pad" to --part--.

Column 10, Line 5, after "said inversion" delete "said inversion unit".

Signed and Sealed this

Twenty-fourth Day of February, 2009

JOHN DOLL
*Acting Director of the United States Patent and Trademark Office*